INVENTOR.
Jack H. Van Gorder
BY
Robert L. Spencer
ATTORNEY

Jan. 14, 1969   J. H. VAN GORDER   3,421,608
CLUTCH WITH AUTOMATIC MODULATING VALVES
Filed Dec. 8, 1966   Sheet 2 of 2
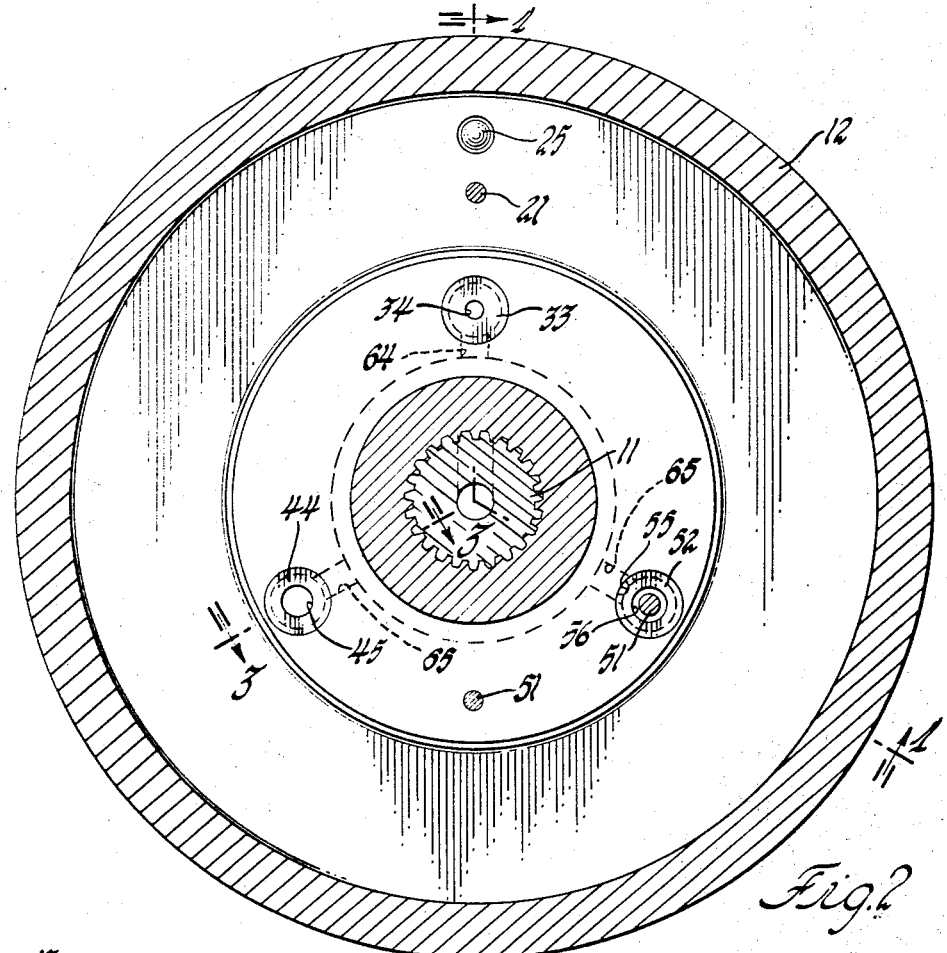
Fig. 2
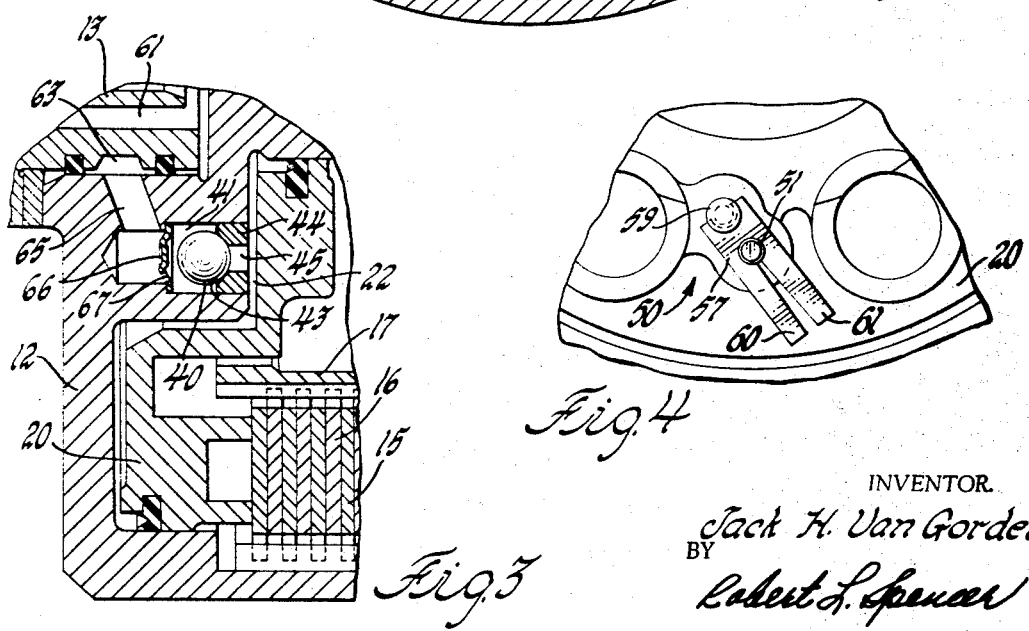
Fig. 3
Fig. 4
INVENTOR.
Jack H. Van Gorder
BY
Robert L. Spencer
ATTORNEY United States Patent Office 3,421,608
Patented Jan. 14, 1969

1

3,421,608
CLUTCH WITH AUTOMATIC
MODULATING VALVES
Jack H. Van Gorder, Detroit, Mich., assignor to General
Motors Corporation, Detroit, Mich., a corporation of
Delaware
Filed Dec. 8, 1966, Ser. No. 600,110
U.S. Cl. 192—85                                          8 Claims
Int. Cl. F16d 25/02

ABSTRACT OF THE DISCLOSURE

A fluid pressure engaged clutch including a valve in the clutch motor for automatically providing rapid initial engagement and slow final engagement. Centrifugal valves are provided to open successively at increasing clutch speeds so as to engage the clutch more rapidly as clutch speed increases.

By this invention valve means is provided in a power input engine-driven clutch drum for controlling the rate of admission of pressure to a clutch servochamber in two stages. During the interval in which the clutch piston is initially moving toward its clutch-engaging position and prior to completion of clutch engagement, the valve means admits fluid under pressure at a relatively rapid rate. Upon initial contact of the clutch friction engaging members and prior to completion of clutch engagement, the valve means is automatically operable to admit fluid under pressure to the clutch servochamber at a relatively slow rate. In a first speed range of operation of the clutch drum the two rates at which fluid is admitted to the clutch servo are both relatively slow rates as compared to the rates of admission in a second speed range of rotation of the clutch drum. In a third speed range of rotation of the clutch drum the two rates of admission of fluid pressure to the clutch servo are higher than when the clutch drum is rotated in the afore-mentioned speed range. One of the clutch regulating valves is adapted to admit pressure to a clutch servo through two passages arranged in parallel relationship prior to initial contact of the clutch members and to block off one of these passages during completion of clutch engagement after initial contact of the clutch members and is automatically adjustable to compensate for clutch wear such that the valve is not affected in its operation by wear of the clutch-engaging members. This regulating valve is self-adjusting relative to its valve seat such that the valve will close only upon initial contact of the clutch-engaging members and will automatically adjust itself relative to its seat to continue to close upon initial contact of the clutch-engaging members irrespecive of wear of these members.

In addition to the self-adjustable regulating valve for controlling the rate of admission of pressure to the clutch servo in two stages, two auxiliary centrifugally responsive valves are provided in the engine driven clutch drum. At clutch drum speeds of rotation in a first speed range, both speed-responsive valves will be closed such that all fluid is admitted to the clutch servo solely under control of the self-adjustable regulating valve. At clutch drum speeds of rotation in a second higher speed range one of the centrifugal force-responsive valves will open to admit fluid to the clutch servo through a restricted orifice controlled by the one centrifugal valve in addition to passage means controlled by the self-adjusting regulating valve.

2

In a third higher speed range of rotation of the clutch drum the first-mentioned centrifugal force-responsive valve will remain open and a second centrifugal force-responsive valve will also open to admit pressure to the clutch servo through an additional restricted orifice controlled by the second centrifugal force-responsive valve. Accordingly, in a first speed range of the engine-driven clutch drum, fluid will be admitted to the clutch servo at two different rates. In a second speed range of rotation of the clutch drum fluid will be admitted to the clutch servo at two different rates controlled by the regulating valve and also through an additional passage to accomplish more rapid clutch engagement than when the clutch drum is rotating in its first relatively slow speed range. In the third speed range of rotation of the clutch drum pressure is admitted to the clutch servo at two different rates controlled by the regulating valve and through two additional passages such that movement of the clutch servo toward its clutch-engaging position is more rapid than when operating in either the first or second speed range of rotation of the clutch drum.

These and other features and advantages of this invention will be apparent from the following description and claims taken in conjunction with the following drawings, in which:

FIGURE 2 is a sectional view taken along the line 2—2 of FIGURE 1;

FIGURE 3 is a sectional view taken along the line 3—3 of FIGURE 2; and

FIGURE 4 is an end view of a valve retainer in its assembly on a valve stem.

Figure 1:
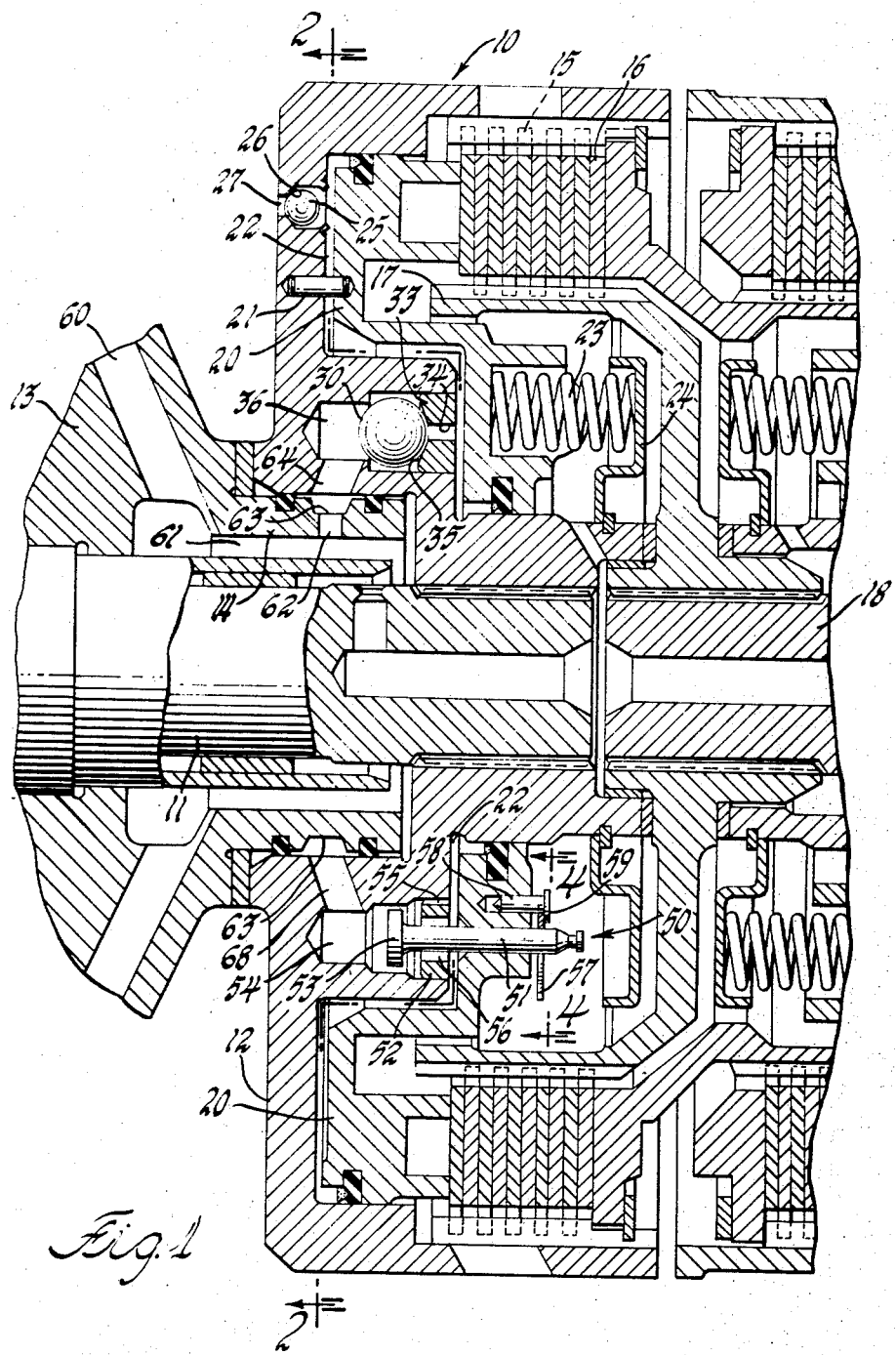
FIGURE 1 is a longitudinal sectional view through a transmission clutch constructed in accordance with the principles of this invention.

Referring to the drawings, there is shown a clutch 10 constructed in accordance with the principles of this invention. As shown in FIGURE 1, a power shaft 11 drives a clutch drum 12. Shaft 11 is rotatably supported within a clutch housing 13 having an axially-extending boss 14 upon which clutch drum 12 is rotatably supported. A series of drive clutch discs 15 are splined to and driven by clutch drum 12. A series of driven clutch discs 16 are splined to a driven clutch hub 17 which is splined to a power delivery shaft 18. A clutch actuator piston 20 is pinned for rotation with clutch drum 12 by a pin 21 and forms with clutch drum 12 a servochamber 22 adapted to receive fluid under pressure. A clutch release spring 23 seated upon a spring seat 24 yieldably biases piston 20 towards its clutch release position.

Three ball valves, two of which are shown in FIGURE 1 and the third of which is shown in FIGURE 3 are mounted in engine-driven clutch drum 12. Ball valve 25 located in the outer radial zone of clutch drum 12 is a residual oil exhaust valve for exhausting oil from the outer radial zone of chamber 22 when chamber 22 is connected to exhaust. Upon admission of fluid under pressure to chamber 22, valve 25 will seat upon valve seat 26 formed in clutch drum 12 to prevent exhaust of fluid from chamber 22 through exhaust passage 27 in drum 12.

A second ball valve 30 shown in FIGURE 1 is carried by clutch drum 12 and is adapted to seat upon a valve seat 35 formed on a ball seat plug 33 carried by drum 12. A restricted orifice passage 34 in plug 33 connects to chamber 22. Drum 12 forms a chamber 36 on the side of ball 30 opposite from passage 34. Plug 33 is shaped to provide a wide angle valve seat 35, preferably 140 degrees, adapted to receive ball 30. Orifice passage 34 is preferably a .060 diameter passage.

A third ball valve 40 is disposed in a chamber 41 formed in clutch drum 12 and is adapted to be seated upon a seat 43 formed on a ball valve plug 44 having a restricted orifice passage 45 therethrough in communication with clutch servochamber 22. Plug 44 is provided with a ball seat 43 of a lesser angle than the angle of valve seat 35 of plug 33, for example 100 degrees. Both plugs 33 and 44 are disposed radially the same distance from the axis of rotation of drum 12, as is clearly shown in FIGURE 2. Passage 45 is of larger diameter than passage 34, preferably .150 diameter.

A self-adjusting regulating valve 50 includes a stem 51 which extends through a valve plug 52 carried by clutch drum 12 and through piston 20. A valve head 53 on stem 51 is disposed in a chamber 54 on the side of plug 52 opposite clutch servochamber 22. A restricted passage 55 through plug 52 permanently connects chamber 22 to chamber 54. A relatively unrestricted passage 56 through plug 52 is controlled by valve head 53. Passage 55 is more highly restricted than either passage 34 or passage 45, for example .035 inch diameter. Passage 56 is preferably of larger diameter than passages 34 or 45, for example .230 diameter and receives valve stem 51 which is preferably .124 diameter. A regulating valve retainer 57 is mounted on stem 51 with one end of retainer 57 disposed adjacent to and slidably arranged with respect to a pin 58 carried by piston 20 and between one end of piston 20 and a head 59 formed on pin 58. As best shown in FIGURE 4, retainer 57 is slotted or cut away to form two legs 60, 61 such that retainer 57 normaly frictionally grips stem 51 of valve 50 and is movable as a unit with valve stem 51. Retainer 57 is initially mounted on stem 51 to position valve head 53 axially relative to valve plug 52 such that fluid under pressure may pass from chamber 54 to chamber 22 through passage 56 as piston 20 moves towards clutch discs 15, 16. Head 53 will contact plug 52 and close off passage 56 prior to the time piston 20 completes its travel towards a clutch-engaging position. Port 56 is blocked off by head 53 at the time piston 20 has moved clutch discs 15, 16 into friction-slipping engagement with each other and prior to completion of clutch engagement. Piston 20, for example, may travel .018 inch after initial friction contact of clutch discs 15, 16 in completing clutch engagement after valve head 53 contacts plug 52 and closes off passage 56. Assuming that valve head 53 has closed off passage 56, valve 50 cannot move further in the direction of travel of piston 20 and piston 20 in completing the clutch engagement will force retainer 57 axially on stem 51 towards the end of stem 51 opposite head 53 the distance required for piston 20 to travel after initial clutch disc contact to complete clutch engagement, or, in the example .018 inch. It will be apparent that, in the example given that retainer 57 which is in friction-gripping contact with stem 51 will automatically be positioned on stem 51 to position valve head 53 relative to valve plug 52 such that head 53 will always block off passage 56 at initial contact of clutch discs 15, 16. In the event that due to wear of the clutch discs the piston must travel a greater distance to complete clutch engagement, retainer 57 will automatically be moved on stem 51 in a direction away from head 53 such that head 53 will contact valve plug 52 at initial clutch disc contact irrespective of the increase in piston travel required. Thus, valve 50 is automatically self-adjusted to compensate for variation in piston travel required for complete clutch engagement to block off passage 56 at initial contact of the clutch discs. Upon exhaust of pressure from chamber 22, spring 23 will move piston 20 towards its clutch release position and retainer 57 will contact head 59 of pin 58 such that valve 50 is mechanically moved with piston 20 such that head 53 opens passage 56 for fluid discharge through passage 56.

In operation, fluid under pressure from a pressure source, not shown, and under control of valving, not shown, is admitted to a passage 60 when clutch engagement is desired. Chamber 36 in clutch drum 12 is connected to passage 60 through passages 61, 62 an annular recess 63 in housing portion 14, and a passage 64 through clutch drum 12. Chamber 41 is connected to passages 60 and 61 through annular grooves 63, and a passage 65. A ball retainer 66 for ball valve 40 is provided with openings 67 to permit fluid flow through retainer 66. Chamber 54 is connected to passages 60, 61, and groove 63 through a passage 68 in drum 12. Upon admission of fluid pressure to chambers 36 and 41, the pressure will tend to seat ball valve 30 on seat 35 to block off passage 34 and the pressure in chamber 41 will tend to seat ball valve 40 on seat 43 to block off passage 45. With valves 30 and 40 seated on their respective valve seats, fluid pressure will initially be admitted to servochamber 22 primarily through passage 56 in valve plug 52 to move piston 20 to place clutch discs 15, 16 in friction contact slipping engagement. Upon contact of clutch discs 15, 16 valve head 53 will block off passage 56 such that further fluid flow into chamber 22 will be solely through restricted passage 55 to complete the engagement of the clutch discs. This action of valve 50 provides rapid initial movement of piston 20 towards its clutch-engaging position to establish initial contact of the clutch disc. Upon contact of discs 15, 16, further movement of piston 20 towards clutch engagement is at a slower rate to provide smooth completion of the clutch disc engagement without shock or bump.

As previously pointed out, ball valves 30 and 40 are seated on seats having a different slope and are rotated with clutch drum 12. Ball seat 43 preferably extends at an angle of 50 degrees to the axis of rotation of drum 12 such that the included angle between the seat contact with ball 40 at opposite sides of ball 40 is 100 degrees. Ball seat 35 preferably extends at an angle of 70 degrees with respect to the axis of rotation of drum 12 such that the included angle between the seat contact and the opposite sides of ball 30 is 140 degrees. Assuming that ball valve 30 is seated upon seat 35, pressure in chamber 36 biases valve 30 onto seat 35, while pressure in chamber 22 effective through passage 34 tends to bias ball valve 30 off of seat 35. However, the pressure in chamber 36 acts on a much larger area of ball 30 than does pressure in passage 34. Due to this differential area a net thrust is applied to ball 30 tending to maintain ball 30 seated upon seat 35. In like manner pressure in chamber 41 biases valve 40 in contact with seat 43, while pressure in chamber 22 acting through passage 45 tends to bias valve 40 off of seat 43. Since the pressure in chamber 41 acts on a greater area of ball 40 than does the pressure in passage 45, a net thrust is applied to ball 40 tending to maintain the ball on its seat.

Ball valves 30 and 40 are speed-responsive valves responsive to centrifugal force and are adapted to become unseated at different speeds of rotation. At speeds of rotation of drum 12 below a first-predetermined speed, for example 1,000 r.p.m., both ball valves 30 and 40 will be seated. Fluid pressure will be admitted to chamber 22 through passages 56, 55 until clutch discs 15, 16 make contact. At this time valve 50 closes and pressure for completing clutch engagement enters chamber 22 through passage 55. This is the manner of operation of clutch engagement with drum 12 rotating in a first speed range of between idle speed (approximately 500 r.p.m.) and 1,000 r.p.m.

In the event that drum 12 is rotating in a second higher speed range at the time the clutch is to be engaged, for example at speeds above 1,000 r.p.m. and below 2,000 r.p.m., centrifugal force acting upon ball valve 30 will cause valve 30 to become unseated to admit pressure from chamber 36 to servochamber 22 through passage 34. Valve 40 will remain seated and valve 50 will function in the same manner as previously described. Fluid pressure will initially be admitted to chamber 22 through both passages 34 and 56 and restricted passage 55. After initial contact of clutch discs 15, 16, valve 50 will block off passage 56 and completion of clutch engagement will be accomplished by fluid entering chamber 22 through restricted passages 34 and 55. In this second speed range of operation initial clutch disc contact and completion of clutch engagement is accomplished at a more rapid rate than in the first speed range of below 1,000 r.p.m. This is desirable since it prevents undue slippage of the clutch surfaces, development of heat, wear and burning of the clutch discs.

In the event that drum 12 is rotated in a third speed range, for example above 2,000 r.p.m. at the time clutch engagement is desired, ball valve 30 will remain unseated and centrifugal force acting upon ball valve 40 will force valve 40 off its seat 43 to admit pressure from chamber 41 to chamber 22 through passage 45. Pressure will initially be admitted to chamber 22 through passages 56, 55, 34 and 45. Upon clutch disc contact, passage 56 will be blocked off and completion of clutch engagement will be accomplished through passages 55, 34 and 45. It will be apparent that clutch engagement will be at a more rapid rate when operating in this third speed range than when operating in the aforesaid second speed range. This again is desirable to prevent clutch disc burning and wear when engaging the clutch with drum 12 rotating in this third higher speed range.

In all three speed ranges, valve 50 will close to block off passage 56 after initial clutch disc contact. In a first speed range of rotation of clutch drum 12, below 1,000 r.p.m. fluid flow to servochamber 22 is initially through passages 56, 55, and subsequently only through passage 55 to provide the slowest rate of movement of piston 20 towards its clutch disc contact position and to provide the slowest rate of clutch disc engagement by admission of pressure solely through passage 55 upon initial clutch disc contact. After initial clutch contact, completion of clutch engagement is controlled by passage 55 which is .035 diameter and the most highly restricted of all the passages through clutch drum 12.

In the second speed range of rotation (1,000–2,000 r.p.m.) of clutch drum 12, pressure is initially admitted to servochamber 22 through passages 55, 56, 34. After initial clutch disc contact, completion of clutch engagement is by pressure entering chamber 22 through passage 55 (.035 diameter) and passage 34 (.060 diameter).

In the third speed range of rotation pressure is initially admitted to chamber 22 through passages 55, 56, 34, 45. After initial clutch disc contact, completion of clutch engagement is accomplished by pressure entering chamber 22 through passage 55 (.035 diameter), passage 34 (.060 diameter), and passage 45 (.150 diameter). It will be apparent that while two stages of admission of pressure to chamber 22 are provided for in each speed range, the rate of clutch engagement in the second speed range will be greater than in the first speed range and that the rate of completion of engagement in the third speed range will be more rapid than the rate of completion of clutch engagement in either the first or second speed ranges of rotation of drum 12.

I claim:

1. A clutch comprising a clutch drum, a servopiston forming with said drum a servochamber adapted to receive fluid under pressure, clutch discs adapted to be engaged by said piston in response to fluid pressure in said servochamber, a second chamber in said clutch drum adapted to receive fluid under pressure, first and second passages between said chambers, a valve having an elongated body with a head on one end of the body movable with said piston for controlling one of said passages, said piston positioning said valve head to open said valve controlled passage when said piston is removed from contact with said clutch discs, and said piston positioning said valve head to close said valve controlled passage upon initial contact of said piston with said clutch discs.

2. A clutch as set forth in claim 1 wherein the valve controlled passage is relatively unrestricted and the other of said passages is relatively restricted to admit pressure to said servo chamber at a relatively slow rate after said valve-controlled passage has been closed by said valve.

3. A clutch as set forth in claim 1 including means for adjusting the position of said valve relative to said passages to compensate for wear of said clutch discs.

4. A clutch as set forth in claim 1 including a member carried by said valve and coacting with said piston automatically operable to adjust said valve relative to said valve controlled passage whereby said valve is effective to block off the passage controlled by said valve at initial contact of said piston with said clutch discs irrespective of variation of piston travel required to establish initial contact of said piston with said clutch discs.

5. A clutch comprising a clutch drum, a servopiston forming with said drum a servochamber adapted to receive fluid under pressure, engageable and releasable clutch discs, said piston being movable towards a clutch-engaging position in response to admission of pressure to said servochamber, a second chamber in said drum, a pair of passages for connecting said chambers, a valve movable with said piston and adapted to block off one of said passages upon initial contact of said clutch discs with each other, a third chamber in said drum, a restricted passage connecting said third chamber to said servochamber, a centrifugal valve in said third chamber adapted to block off said last-mentioned restricted passage upon rotation of said drum at speeds below a predetermined speed and to open said last-mentioned restricted passage upon rotation of said drum at speeds above said predetermined speed, and passage means for admitting fluid under pressure to said second and third chambers.

6. A clutch as set forth in claim 5 including means carried by said piston for retaining said first-mentioned valve in a position relative to said piston to close off said valve controlled passage upon initial contact of said clutch discs with each other irrespective of variation of the range of travel of said piston required to establish initial contact of said clutch discs.

7. A clutch as set forth in claim 5 including a fourth chamber in said clutch drum, a restricted passage connecting said fourth chamber to said servochamber, a second centrifugal valve in said fourth chamber adapted to block off the passage between said fourth chamber and said servochamber upon rotation of said drum in said aforementioned second speed range of rotation of said drum and to open said passage between said fourth chamber and said servochamber upon rotation of said drum in a third higher speed range of rotation, and passage means for admitting fluid under pressure to said fourth chamber.

8. A clutch comprising a clutch drum, a servopiston forming with said drum a servochamber adapted to receive fluid under pressure, engageable and releasable clutch discs adapted to be engaged by said piston upon admission of pressure to said servochamber, a second chamber in said drum, passage means for admitting pressure to said second chamber, first and second passages between said chambers, a valve having a head disposed in said second chamber for at times blocking off said first passage and a stem extending through said piston, a retainer in friction-gripping relation with said stem and extending into the path of travel of said piston, said retainer being automatically moved relative to said stem by said piston upon wear of said clutch discs such that said valve head is effective to block off said first passage upon initial contact of said clutch discs with each other irrespective of wear of said clutch discs and variations in the piston travel required to establish initial clutch disc contact.

References Cited

UNITED STATES PATENTS 2,756,851 7/1956 Collins.
2,869,701 1/1959 Yokel.
3,282,385 11/1966 Snyder.

FOREIGN PATENTS 343,722 2/1960 Switzerland.

BENJAMIN W. WYCHE III, *Primary Examiner.*

U.S. Cl. X.R.

192—103, 109; 137—54; 251—117